United States Patent
Kerrigan et al.

(12) 
(10) Patent No.: US 11,972,287 B2
(45) Date of Patent: Apr. 30, 2024

(54) DATA TRANSFER PRIORITIZATION FOR SERVICES IN A SERVICE CHAIN

(71) Applicant: Dell Products L.P., Round Rock, TX (US)

(72) Inventors: Martin Kerrigan, Waterfall (IE); David M. Hasseler, Cedar Park, TX (US); Ashish Goel, Bangalore (IN)

(73) Assignee: Dell Products L.P., Round Rock, TX (US)

(*) Notice: Subject to any disclaimer, the term of this patent is extended or adjusted under 35 U.S.C. 154(b) by 448 days.

(21) Appl. No.: 17/502,292

(22) Filed: Oct. 15, 2021

(65) Prior Publication Data

US 2023/0124885 A1    Apr. 20, 2023

(51) Int. Cl.
*G06F 9/48*    (2006.01)
*G06F 9/54*    (2006.01)

(52) U.S. Cl.
CPC .......... *G06F 9/4818* (2013.01); *G06F 9/4887* (2013.01); *G06F 9/542* (2013.01); *G06F 9/546* (2013.01)

(58) Field of Classification Search
CPC ............. G06F 1/329; G06F 2209/5021; G06F 3/1263; G06F 9/4843; G06F 9/4881; G06F 9/4887
See application file for complete search history.

(56) References Cited

U.S. PATENT DOCUMENTS

| | | | | |
|---|---|---|---|---|
| 8,732,258 B2 * | 5/2014 | Seminaro | ............... | H04L 67/025 726/5 |
| 9,705,755 B1 * | 7/2017 | Allen | .................. | H04L 41/5048 |
| 11,743,200 B2 * | 8/2023 | Christidis | ............. | H04L 47/522 709/224 |

OTHER PUBLICATIONS

Dell EMC, "Dell EMC MD1400 and MD1420," Specification Sheet, 2019, 3 pages.
Rabbitmq, "Quorum Queues," https://www.rabbitmq.com/, Accessed Oct. 12, 2021, 5 pages.
Apache, "Apache Kafka," https://kafka.apache.org, Accessed Oct. 15, 2021, 4 pages.
Dell EMC, "Dell EMC PowerVault ME4 Series Storage Specification Sheet," 2018, 5 pages.
Dell, "Dell PowerVault MD3 Storage Array Series," 2016, 2 pages.
Dell EMC, "PowerVault ME4 Series ADAPT Software," White Paper, Feb. 2019, 13 pages.

* cited by examiner

*Primary Examiner* — Andy Ho
(74) *Attorney, Agent, or Firm* — Ryan, Mason & Lewis, LLP

(57) ABSTRACT

An apparatus comprises at least one processing device configured to monitor, by a first service in a service chain, a first set of processing queues comprising two or more different processing queues associated with two or more different priority levels. The processing device is also configured to process, by the first service, a given portion of data stored in at least one of the two or more different processing queues in the first set of processing queues. The processing device is further configured to determine prioritization information associated with the given portion of the data and to select, based on the prioritization information, a given one of two or more different processing queues in a second set of processing queues associated with a second service in the service chain, and to store the given portion of the data in the given processing queue in the second set of processing queues.

20 Claims, 8 Drawing Sheets

DATA TRANSFER PRIORITIZATION FOR SERVICES IN A SERVICE CHAIN

FIELD

The field relates generally to information processing, and more particularly to techniques for managing information processing systems.

BACKGROUND

Information technology infrastructure may include information technology assets deployed at various customer or remote computing sites, which are managed by a management entity at a central or management computing site. Various data may be exchanged between information technology assets deployed at the remote computing sites and the central or management computing site. Such data may be used for performing monitoring and analysis of the deployed information technology assets. As the amount of deployed information technology assets increases, so does the amount of data that needs to be transferred between the remote computing sites and the central or management computing site.

SUMMARY

Illustrative embodiments of the present disclosure provide techniques for data transfer prioritization for services in a service chain.

In one embodiment, an apparatus comprises at least one processing device comprising a processor coupled to a memory. The at least one processing device is configured to perform the steps of monitoring, by a first one of two or more services in a service chain, a first one of two or more sets of processing queues associated with the first one of the two or more services in the service chain, each of the two or more sets of processing queues comprising two or more different processing queues associated with two or more different priority levels and processing, by the first one of the two or more services in the service chain, at least a given portion of data stored in at least one of the two or more different processing queues in the first one of the two or more sets of processing queues. The at least one processing device is also configured to perform the steps of determining prioritization information associated with the given portion of the data, selecting, based at least in part on the determined prioritization information associated with the given portion of the data, a given one of two or more different processing queues in a second one of the two or more sets of processing queues associated with a second one of the two or more services in the service chain, and storing the given portion of the data in the given one of the two or more different processing queues in the second one of the two or more sets of processing queues associated with the second one of the two or more services in the service chain.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
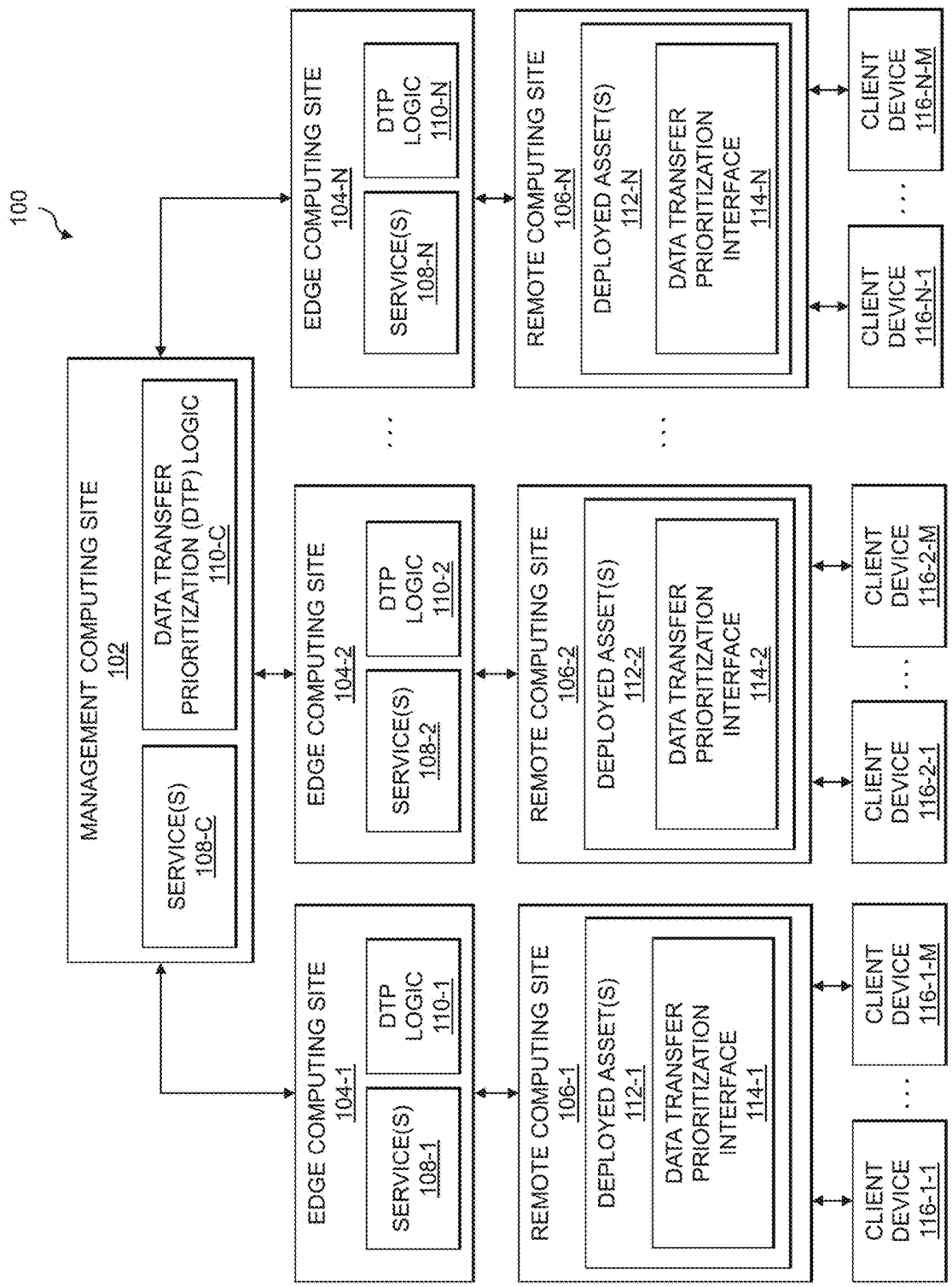
FIG. 1 is a block diagram of an information processing system configured for data transfer prioritization for services in a service chain in an illustrative embodiment.

FIG. 1 shows an information processing system 100 configured in accordance with an illustrative embodiment. The information processing system 100 is assumed to be built on at least one processing platform and provides functionality for data transfer prioritization among a management computing site 102, a set of edge computing sites 104-1, 104-2, ... 104-N (collectively, edge computing sites 104), and a set of remote computing sites 106-1, 106-2, ... 106-N (collectively, remote computing sites 106). While FIG. 1 shows an arrangement where there is a one-to-one relationship between the edge computing sites 104 and the remote computing sites 106 (e.g., where each of the remote computing sites 106 is associated with one of the edge computing sites 104), this is not a requirement. It is possible for one of the edge computing sites 104 to be associated with multiple remote computing sites 106, for one of the remote computing sites 106 to be associated with multiple edge computing sites 104, combinations thereof, etc.

The management computing site 102, also referred to as a core data center or management site 102, is assumed to comprise a plurality of core devices or core nodes (not shown in FIG. 1) that run a set of core-hosted services 108-C. Each of the edge computing sites 104 is also assumed to comprise a plurality of edge devices or edge nodes (not shown in FIG. 1) that run sets of edge-hosted services 108-1, 108-2, ... 108-N (collectively, edge-hosted services 108-E). The core-hosted services 108-C and edge-hosted services 108-E are collectively referred to as services 108. As used herein, the term "service" is intended to be broadly construed to include applications, microservices, and other types of services.

The services 108 are assumed to process data (e.g., telemetry data) that is produced by sets of deployed information technology (IT) assets 112-1, 112-2, . . . 112-N (collectively, deployed IT assets 112) at the remote computing sites 106. The IT assets may include, by way of example, physical and virtual computing resources deployed at the remote computing sites 106. Physical computing resources may include physical hardware such as servers, storage systems, networking equipment, Internet of Things (IoT) devices, health monitoring devices or other types of wearable devices, satellite devices, other types of processing and computing devices, etc. Virtual computing resources may include virtual machines (VMs), software containers (also referred to herein as containers), etc.

In some cases, the data may be processed "locally" at the edge computing sites 104 by the edge-hosted services 108-E. The edge computing sites 104 are assumed to be located closer to the remote computing sites 106 than the central or management computing site 102, and in some embodiments the edge computing sites 104 may be co-located with the remote computing sites 106 (e.g., they may be part of the same data centers, the edge computing sites 104 may operate or run within the remote computing sites 106, etc.). In other cases, the data may be sent from the remote computing sites 106 to the central or management computing site 102 for processing by the core-hosted services 108-C. In still other cases, the data may be processed at least in part by the edge-hosted services 108-E and at least in part by the core-hosted services 108-C.

The information processing system 100 includes a plurality of client devices that are coupled to each of the remote computing sites 106. A set of client devices 116-1-1, . . . 116-1-M (collectively, client devices 116-1) are coupled to remote computing site 106-1, a set of client devices 116-2-1, . . . 116-2-M (collectively, client devices 116-2) are coupled to remote computing site 106-2, and a set of client devices 116-N-1, . . . 116-N-M (collectively, client devices 116-N) are coupled to remote computing site 106-N. The client devices 116-1, 116-2, . . . 116-N are collectively referred to as client devices 116. It should be appreciated that the particular number "M" of client devices 116 that are connected to each of the remote computing sites 106 may be different. In other words, the number M of client devices 116-1 coupled to the remote computing site 106-1 may be the same as or different than the number M of client devices 116-2 coupled to the remote computing site 106-2. Further, a particular client device 116 may be connected or coupled to only a single one of the remote computing sites 106 at any given time, or may be coupled to multiple ones of the remote computing sites 106 at any given time, or may be connected to different ones of the remote computing sites 106 at different times. In some embodiments, one or more of the client devices 116 may also or alternatively be connected or coupled with the management computing site 102 and/or one or more of the edge computing sites 104.

The client devices 116 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 116 may also or alternately comprise virtualized computing resources, such as VMs, containers, etc.

The client devices 116 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

As described elsewhere herein, end-users of the client devices 116 (e.g., which may be customers operating the deployed IT assets 112, support agents of a management entity operating the management computing site 102 that deploys the deployed IT assets 112, etc.) may request that data transfer among the management computing site 102, the edge computing sites 104 and remote computing sites 106, as well as data transfer among different ones of the services 108, be prioritized using data transfer prioritization logic 110.

The management computing site 102, the edge computing sites 104, the remote computing sites 106 and the client devices 116 are assumed to be coupled via one or more networks. The networks coupling the client devices 116, the remote computing sites 106, the edge computing sites 104 and the management computing site 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the client devices 116 to the remote computing sites 106, while a second type of network (e.g., a private network) couples the remote computing sites 106 to the edge computing sites 104 and to the management computing site 102.

In some embodiments, the management computing site 102, the edge computing sites 104, and the remote computing sites 106 collectively provide at least a portion of an IT infrastructure operated by an enterprise, where the client devices 116 are operated by users of the enterprise. The IT infrastructure comprising the management computing site 102, the edge computing sites 104 and the remote computing site 106 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management computing site 102, the edge computing sites 104, and/or the remote computing sites 106. A given enterprise system may host IT assets 112 that are associated with multiple enterprises (e.g., two or more different businesses, organizations or other entities) operating different ones of the remote computing sites 106.

Although not explicitly shown in FIG. 1, one or more input-output devices such as keyboards, displays or other types of input-output devices may be used to support one or more user interfaces to the management computing site 102, the edge computing sites 104, and the remote computing sites 106, as well as to support communication between the management computing site 102, the edge computing sites 104, the remote computing sites 106 and other related systems and devices not explicitly shown.

As noted above, the management computing site 102 hosts core-hosted services 108-C and the edge computing sites 104 host edge-hosted services 108-E, where the core-hosted services 108-C and the edge-hosted services 108-E are collectively referred to as services 108. The client devices 116 in some embodiments send requests to access the services 108 for analyzing telemetry of other data that is generated by the IT assets 112 deployed at the remote computing sites 106. This may be for the purposes of case analysis (e.g., for issues encountered on the IT assets 112), for monitoring and analysis of the deployed IT assets 112, etc. Some of such requests to access the services 108 may include metadata associated with the telemetry data, where the metadata includes prioritization information specifying whether transfer of the telemetry data from the deployed IT assets 112 at the remote computing sites 106 to the edge-hosted services 108-E at the edge computing sites 104 and/or to the core-hosted services 108-C at the management computing site 102 should be prioritized. The deployed IT assets 112-1, 112-2, . . . 112-N may each have an associated data transfer prioritization interface 114-1, 114-2, . . . 114-N (collectively, data transfer prioritization interfaces 114). The data transfer prioritization interfaces 114 may be accessed by the client devices 116 and/or one or more of the services 108, so as to enable configuration of prioritization for data transfer from the deployed IT assets 112.

In some cases, the requests can be serviced by the edge-hosted services 108-E and edge computing devices or edge nodes at the edge computing sites 104 will service the requests and provide responses (if applicable) to the requesting client devices 116. If requests are directed to one of the core-hosted services 108-C, the edge computing devices or edge nodes at the edge computing sites 104 will forward such requests to the management computing site 102. The management computing site 102 will service the requests, and provide responses (if applicable) back to the edge computing sites 104, which will in turn provide the responses back to the requesting client device 116. In some cases, requests to be serviced by the core-hosted services 108-C may be sent directly to the management computing site 102, rather than via the edge computing sites 104.

In illustrative embodiments, the edge computing sites 104 and the management computing site 102 implement respective instances of data transfer prioritization logic 110-1, 110-2, . . . 110-N and 110-C (collectively, data transfer prioritization logic 110). The data transfer prioritization logic 110 provides for analyzing metadata that is associated with telemetry data, to determine whether such telemetry data should be transferred and processed by the services 108 with elevated priority or not. This may include storing the telemetry data and associated metadata in different sets of message or processing queues (e.g., high and low priority queues, high, medium and low priority queues, etc.). Further, the data transfer prioritization logic 110 may be used for limiting data transfer prioritization (e.g., in accordance with elevation "credits" or other prioritization parameters, for limited durations, etc.). In some embodiments, for example, telemetry data is processed in a pipeline that includes multiple ones of the services 108, with each of the services 108 being associated with a set of queues and each of the services 108 reading data from respective ones of the queues in a first set of queues (e.g., associated with a previous one of the services 108 in the pipeline) in accordance with a defined prioritization level (e.g., a percentage of time, based on fill conditions of different ones of the queues having different associated priorities, etc.) and writing data to respective ones of the queues in a second set of queues (e.g., associated with a next one of the services 108 in the pipeline) in accordance with the prioritization metadata.

In some embodiments, information associated with the services 108 (e.g., various metrics) as well as information on data transfer prioritization (e.g., prioritization levels, prioritization credits, etc.) may be stored in a database or other data store. The database or other data store may be implemented using one or more of storage systems that are part of or otherwise associated with one or more of the management computing site 102, the edge computing sites 104, the remote computing sites 106, and the client devices 116. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the management computing site 102 and the edge computing sites 104 in this embodiment, the data transfer prioritization logic 110 in other embodiments can be implemented at least in part externally to the management computing site 102 and the edge computing sites 104, for example, as a stand-alone server, set of servers or other types of systems coupled via one or more networks to the management computing site 102 and/or the edge computing sites 104. In some embodiments, the data transfer prioritization logic 110 may be implemented at least in part within one or more of the remote computing sites 106 and/or the client devices 116.

The management computing site 102, the edge computing sites 104 and the remote computing sites 106 in the FIG. 1 embodiment are assumed to be implemented using at least one processing device. Each such processing device generally comprises at least one processor and an associated memory, and implements at least a portion of the functionality of the data transfer prioritization logic 110.

It is to be appreciated that the particular arrangement of the management computing site 102, the edge computing sites 104, the remote computing sites 106, and the client devices 116 illustrated in the FIG. 1 embodiment is presented by way of example only, and alternative arrangements can be used in other embodiments. As discussed above, for example, in some cases the edge computing sites 104 and the remote computing sites 106 may be co-located. As another example, the data transfer prioritization logic 110 may be implemented external to one or both of the management computing site 102 and the edge computing sites 104, such as in the remote computing sites 106 and/or the client devices 116. At least portions of the data transfer prioritization logic 110 may be implemented at least in part in the form of software that is stored in memory and executed by a processor.

It is to be understood that the particular set of elements shown in FIG. 1 for data transfer prioritization is presented by way of illustrative example only, and in other embodiments additional or alternative elements may be used. Thus, another embodiment may include additional or alternative systems, devices and other network entities, as well as different arrangements of modules and other components.

The management computing site 102, the edge computing sites 104, the remote computing sites 106, the client devices 116 and other portions of the system 100, as will be described above and in further detail below, may be part of cloud infrastructure.

The management computing site 102, the edge computing sites 104, the remote computing sites 106, the client devices 116 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The management computing site 102, the edge computing sites 104, the remote computing sites 106, and the client devices 116, or components thereof, may be implemented on respective distinct processing platforms, although numerous other arrangements are possible. For example, in some embodiments at least portions of the edge computing sites 104 and the remote computing sites 106 are implemented on the same processing platform. Further, one or more of the client devices 116 can be implemented at least in part within at least one processing platform that implements at least a portion of the remote computing sites 106, the edge computing sites 104 and/or the management computing site 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the management computing site 102, the edge computing sites 104, the remote computing sites 106, and the client devices 116, or portions or components thereof, to reside in different data centers. Numerous other distributed implementations are possible.

Additional examples of processing platforms utilized to implement the management computing site 102, the edge computing sites 104, the remote computing sites 106 and the client devices 116 and other components of the system 100 in illustrative embodiments will be described in more detail below in conjunction with FIGS. 7 and 8.

It is to be appreciated that these and other features of illustrative embodiments are presented by way of example only, and should not be construed as limiting in any way.

Figure 2:
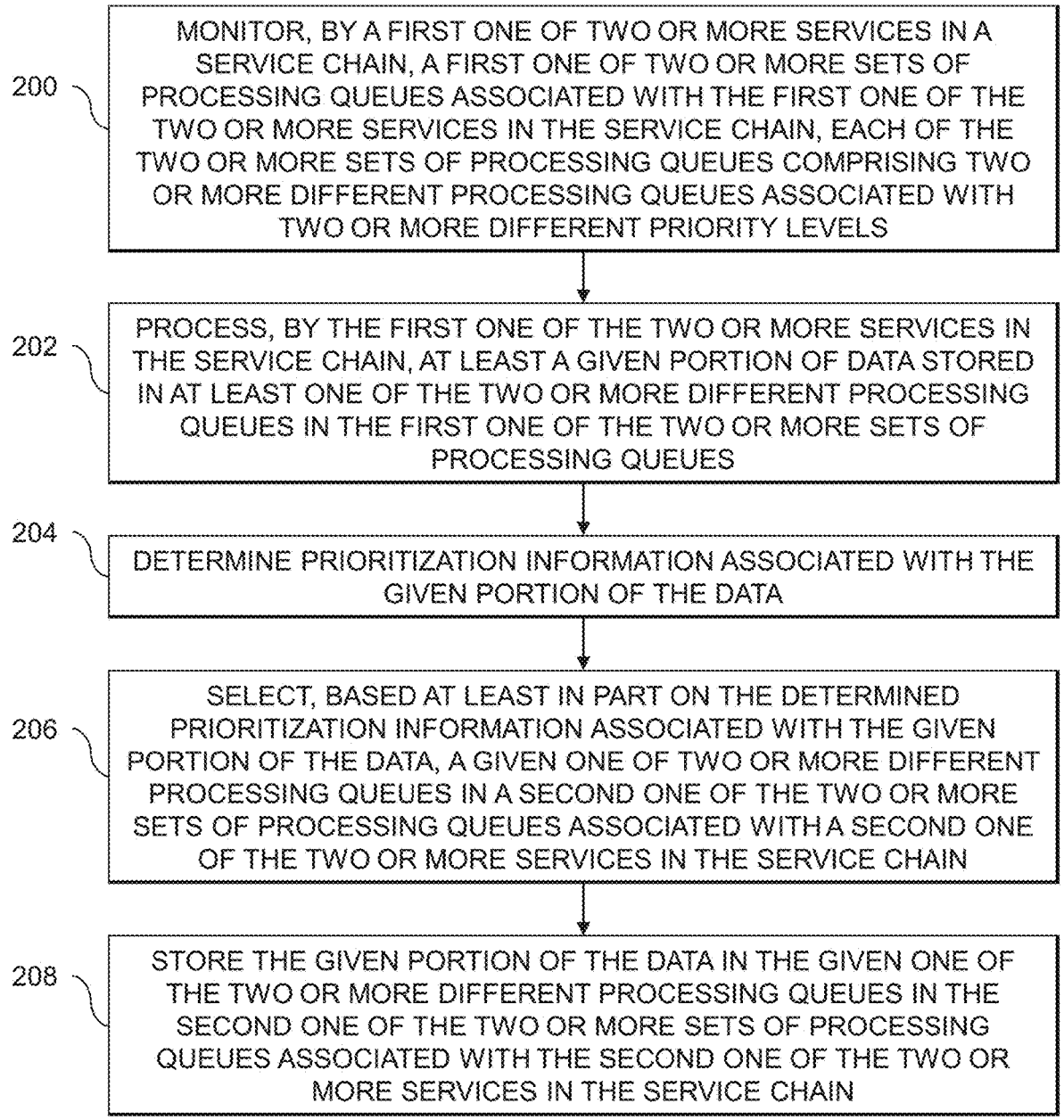
FIG. 2 is a flow diagram of an exemplary process for data transfer prioritization for services in a service chain in an illustrative embodiment.

An exemplary process for data transfer prioritization for services in a service chain will now be described in more detail with reference to the flow diagram of FIG. 2. It is to be understood that this particular process is only an example, and that additional or alternative processes for data transfer prioritization for services in a service chain may be used in other embodiments.

In this embodiment, the process includes steps 200 through 208. These steps are assumed to be performed by the management computing site 102 and the edge computing sites 104 utilizing the data transfer prioritization logic 110. The process begins with step 200, monitoring, by a first one of two or more services in a service chain, a first one of two or more sets of processing queues associated with the first one of the two or more services in the service chain, each of the two or more sets of processing queues comprising two or more different processing queues associated with two or more different priority levels. The two or more services in the service chain may comprise two or more microservices.

In step 202, at least a given portion of data stored in at least one of the two or more different processing queues in the first one of the two or more sets of processing queues is processed by the first one of the two or more services in the service chain. Step 202 may comprise selecting the given portion of the data stored in said at least one of the two or more different processing queues in the first one of the two or more sets of processing queues based at least in part on a designated prioritization level specifying relative frequency of selecting the given portion of the data from each of the two or more different processing queues in the first one of the two or more sets of processing queues. The designated prioritization level may be dynamically adjusted in response to detecting one or more designated conditions. The one or more designated conditions may comprise amounts of data stored in the two or more different processing queues in the two or more sets of processing queues. The designated prioritization level may be specified by an orchestrator service in the service chain. The orchestrator service in the service chain may dynamically adjust the designated prioritization level in response to requests from a management entity operating the service chain.

Prioritization information associated with the given portion of the data is determined in step 204. The prioritization information may be stored in metadata associated with the given portion of the data. The prioritization information may specify a duration for which the given portion of the data is to be processed at an elevated processing priority. A given one of two or more different processing queues in a second one of the two or more sets of processing queues associated with a second one of the two or more services in the service chain is selected in step 206 based at least in part on the determined prioritization information associated with the given portion of the data. The given portion of the data is stored in the given one of the two or more different processing queues in the second one of the two or more sets of processing queues associated with the second one of the two or more services in the service chain in step 208.

The given portion of the data comprises telemetry data that may be associated with at least one IT asset deployed at a remote computing site, the two or more services in the service chain running in at least one of an edge computing site associated with the remote computing site and a management computing site associated with a management entity deploying the at least one information technology asset at the remote computing site. The prioritization information may be specified by a given support agent of the management entity. Step 206 may comprise identifying a remaining amount of prioritization credits allocated to at least one of the given support agent of the management entity and the at least one IT asset, and determining whether the remaining amount of prioritization credits allocated to the given support agent is sufficient to enable elevated priority processing of the given portion of the data by the second one of the two or more services in the service chain.

Determining whether the remaining amount of prioritization credits allocated to the given support agent is sufficient to enable elevated priority processing of the given portion of the data by the second one of the two or more services in the service chain may further comprise providing, to the given support agent, a notification specifying the remaining amount of prioritization credits and receiving, from the given support agent, an instruction on whether to enable elevated priority processing of the given portion of the data by the second one of the two or more services in the service chain. The remaining amount of prioritization credits may comprise at least one of a number of prioritization requests and an amount of data.

Connectivity to deployed products (e.g., IT assets 112) at customer locations (e.g., remote computing sites 106) is an important feature for a management entity that is responsible for managing the deployed IT assets at the remote computing sites. Such connectivity is used for various tasks, including exchange of information. Large amounts of data distributed around multiple remote computing sites 106 may be regularly or periodically transmitted to the management entity at the central or management computing site 102. It is desirable to have such data automatically processed (e.g., using artificial intelligence (AI)) at edge computing sites 104 (e.g., which may be collocated at the remote computing sites 106, which are closer to the remote computing sites 104 than the central or management computing site 102 where the management entity operates, etc.) to proactively identify and remediate issues at the edge computing sites 104. Many issues that occur at the remote computing sites 106, however, are still manually addressed in a reactive manner by support agents (e.g., located at the central or management computing site 102 where the management entity operates). Such support agents utilize so-called "dial home" telemetry data that is sent from deployed products (e.g., IT assets 112) at the remote computing sites 106 to the central or management computing site 102 where the management entity operates. The support agents utilize the dial-home or telemetry data for various tasks, including performing root cause analysis of issues and rectification or remediation of issues. The dial-home or telemetry data may also be utilized for centralized monitoring and reporting which is provided by applications running inside the central or management computing site 102. Although such reactive-based solutions are commonly used, there is a desire for proactive-based solutions.

In illustrative embodiments, a proactive-based solution is utilized where local or edge computing sites 104 perform analysis and monitoring of logs and events, identification of issues, and application of resolutions or remedial actions. The automated edge-based solution may still utilize so-called dial-home functionality, as there may be reasons to send issues to the central or management computing site 102 in which the management entity runs. Such reasons include, but are not limited to, encountering problems or issues that the edge computing sites 104 do not know how to handle, patterns that the edge computing sites 104 identify as suspect and want to send related information to the central or management computing site 102 for more detailed analysis by the centralized management entity, etc.

Dial-home telemetry data can present various challenges and difficulties. In some cases, for example, the data may not be available or may be old. Typically, the telemetry data is at least several hours old (e.g., it may be the last night's data, which may be too old for a support agent that is addressing an issue with a customer or other end-user). Further, sometimes a customer may not agree to send telemetry data to the central or management computing site 102 daily (e.g., or otherwise as often as needed). If a support agent wishes to retrieve the latest data, the support agent may be required to trigger manual collection and wait for it to come "home" to the central or management computing site 102. That journey home of the requested data often must compete with all the routine telemetry data (and other information) that is being sent home to the central or management computing site 102 by default.

Consider, as an example, a customer or other end-user that is on a live call or chat with a support agent, where the support agent is waiting for current telemetry data in order to address a very "hot" or pressing issue experienced by the customer or other end-user with a particular deployed product (e.g., one or more of the IT assets 112 deployed at the remote computing sites 106). In these and other cases, the dial-home connectivity must be very time sensitive. As another example, there may be a need or desire to send the telemetry data home to the central or management computing site 102 with a high priority for a specific period of time in order to handle a particularly complicated or important issue affecting one or more deployed products (e.g., one or more of the IT assets 112 deployed at the remote computing sites 106). As a further example, it may be desirable to have telemetry data sent home on or at a more regular frequency if one or more deployed products (e.g., one or more of the IT assets 112 deployed at the remote computing sites 106) are experiencing particular types of symptoms or issues. The telemetry data files can also be very large, which can also present issues.

In some embodiments, a proactive-based solution for data transfer prioritization is provided which enables a support agent (e.g., with no networking knowledge or privileges) or an automated system that is totally decoupled from network functionality or administration, to perform various data transfer prioritization tasks using the data transfer prioritization logic 110. Such tasks include, but are not limited to: (1) prioritizing the transfer of telemetry or other data being sent home (e.g., to the central or management computing site 102 where a management entity operates) for manual analysis, so that the data is sent home with a higher priority over other data and jumps certain processing queues on the way back; (2) prioritizing telemetry data transfer for an individual data asset or for an individual file; (3) sending the telemetry data home more frequently; and (4) reducing the priority automatically after a set period of time, or some other bound limitation; etc.

In conventional approaches, manual actors (e.g., support agents) and automated monitoring systems typically have no mechanism for adjusting the priority of data transfer between remote computing sites 106 (e.g., where products or other IT assets 112 are deployed) and a central or management computing site 102 (e.g., where a management entity deploying such products or other IT assets 112 operates). Further, conventional approaches do not provide the ability to limit prioritization of data. If priority is elevated, for example, it should not necessarily be elevated for an indefinite amount of time. Logic is needed for automatically controlling elevation or other adjustment of priority to ensure that elevated priority is suitably limited.

Data transfer prioritization logic 110 in some embodiments is used to enable limits to be placed on the prioritization of data transfer using "credits." Because this a requirement and the credits are limited, individuals and automated systems can self-serve prioritization without the need for a central authority or administrator to approve each and every prioritization request. Data transfer prioritization interfaces 114 at each product (e.g., IT assets 112 deployed at remote computing sites 106) enables metadata to be configured, and is a basic building block that supports various aspects of the data transfer prioritization logic 110. The data prioritization interfaces 114 also have advantageous and novel functionality, including the ability to specify quotas. The data prioritization interfaces 114 in some embodiments provide functionality such as: allowing metadata to be configured manually or by an automated system; and allowing resets of running totals that correspond to limits. The data prioritization interfaces 114 can also facilitate turning prioritization on and off, by allowing specification of the metadata for prioritization that the asset will attach to the telemetry data.

The total amount of prioritization that may be done for any particular edge computing site 104, remote computing site 106 or deployed IT asset 112 may be limited or otherwise controlled by the data transfer prioritization logic 110. For example, a given one of the deployed IT assets 112 can be configured such that it is only able to prioritize some maximum amount of data within a designated period of time (e.g., one terabyte (TB) of data in a month). Sending one hundred megabytes (100 MB) from the given deployed IT asset 112 at an elevated prioritization would reduce the remaining total for that month by 100 MB. The remaining total could be automatically reset back to the original maximum at the end of a regular time period (e.g., the end of the month). However, a support agent or automated system at the central or management computing site 102 could reset a total (e.g., if the given deployed IT asset 112 has a limit of 1 TB of prioritized data per month and has exceeded that total thereby not allowing further prioritized data transfer, a support agent could reset that total to allow additional prioritized data transfer by the given deployed IT asset 112 in an urgent situation).

As noted above, the data transfer prioritization logic 110 in some embodiments can also limit the duration of elevated priority. This may be achieved by allowing a conditional setting of priority (e.g., for a limited amount of time, for a limited amount of data, combinations thereof, etc.). Such conditional settings may be enabled by putting a future time when an elevated priority would expire, and include that future time in the metadata. Time expiry logic can be applied when assessing the elevated priority. If the priority needs to be elevated, the data transfer prioritization logic 110 can allow a support agent or automated system at the central or management computing site 102 to elevate priority up to a limited time period based on an expiration time. That way, it is not possible to "forget" to reset the priority back. An example of the metadata for setting a limit to the duration of elevated priority is:
  Prioritization: True
  PrioritizationTimeLimit: "2021-03-09T22:18:26.625Z"

As the telemetry data moves along a pipeline and encounters services that place telemetry data on processing queues, such services can conditionally place the data on different priority queue according to the metadata (e.g., if PrioritizationTimeLimit≥a current time "Now", the data can be placed in a relatively high priority queue). If (PrioritizationTimeLimit>Now), then file or other data transfer is prioritized and, when the service finishes processing the data for a current step, the service writes the data to a relatively high priority queue for the next step that is to be performed (e.g., a next service in the pipeline). Otherwise, when finished processing the data for the current step, the service can write the data to a "normal" or relatively low priority queue for the next step that is to be performed (e.g., a next service in the pipeline).

Figure 3:
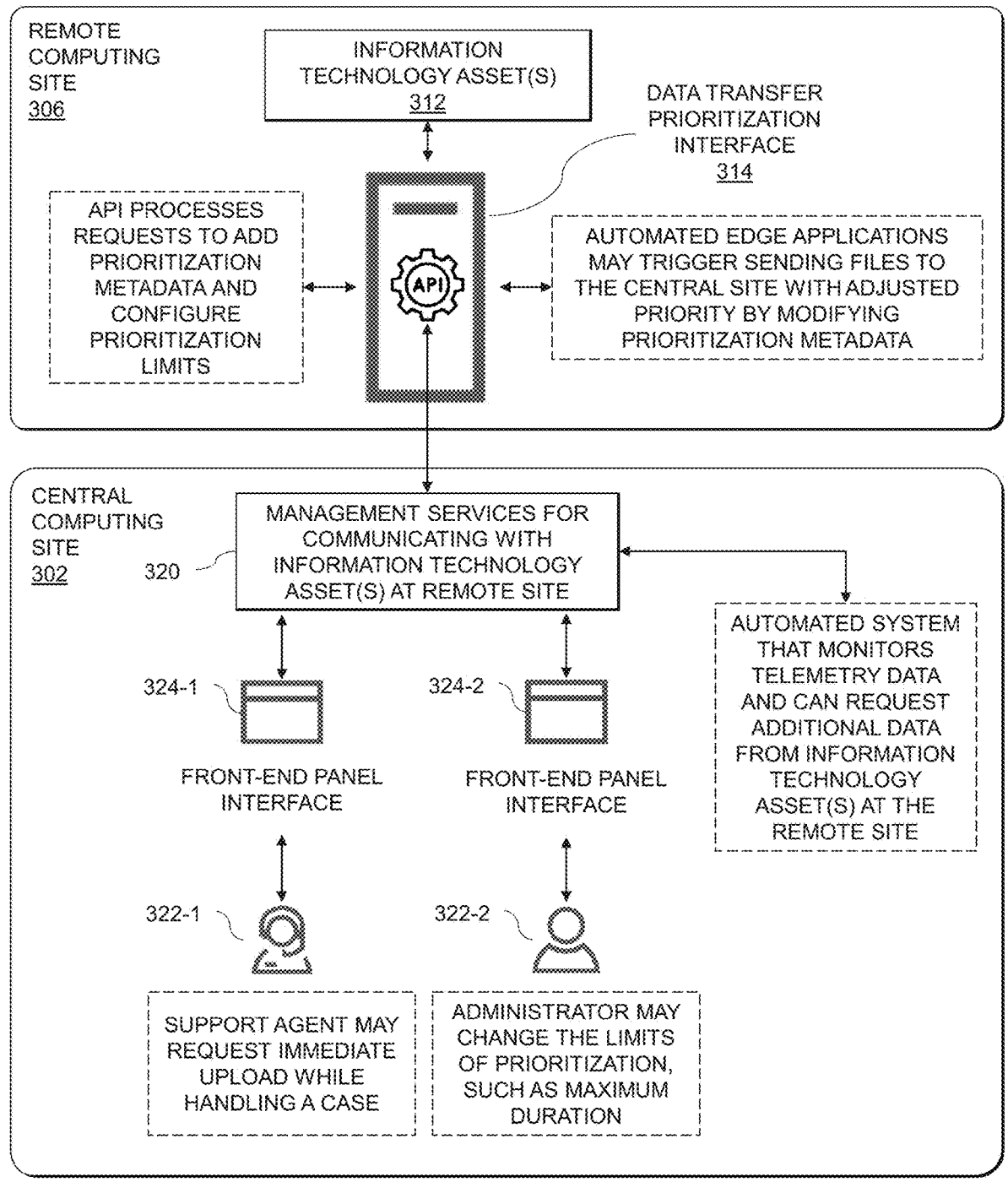
FIG. 3 shows a process flow for activation of prioritized data transfer between a central or management computing site and a remote computing site in an illustrative embodiment.

FIG. 3 illustrates activation of prioritized data transfer between a central or management computing site 302 and a remote computing site 306, and configuration of data transfer prioritization limits. As shown, the remote computing site 306 includes one or more IT assets 312 and a data transfer prioritization interface 314. The data transfer prioritization interface 314 provides an application programming interface (API) which processes requests to add prioritization metadata and configure prioritization limits. The API of the data transfer prioritization interface 314 does so in response to automated edge applications (e.g., at edge computing sites, not shown) that trigger sending of files or other data to the central or management computing site 302 which adjusts priority by modifying the prioritization metadata.

The central or management computing site 302 implements a set of management services 320 for communicating with the IT assets 312 at the remote computing site 306. The management services 320 may provide an automated system that monitors telemetry data received from the IT assets 312 at the remote computing site 306, and can trigger requests for additional data from the IT assets 312 at the remote computing site 306. The management services 320 may be accessed by a support agent 322-1 and an administrator 322-2 via respective front-end panel interfaces 324-1 and 324-2. The support agent 322-1, for example, may utilize the management services 320 to request immediate upload of data from the IT assets 312 while handling a case (e.g., a support call or chat with a customer or end-user of the IT assets 312). The administrator 322-2 may utilize the management services 320 to configure data transfer prioritization limits and other parameters (e.g., total amounts of data which may be transferred with an elevated priority, the maximum duration of data transfer at an elevated priority, etc.).

Figure 4:
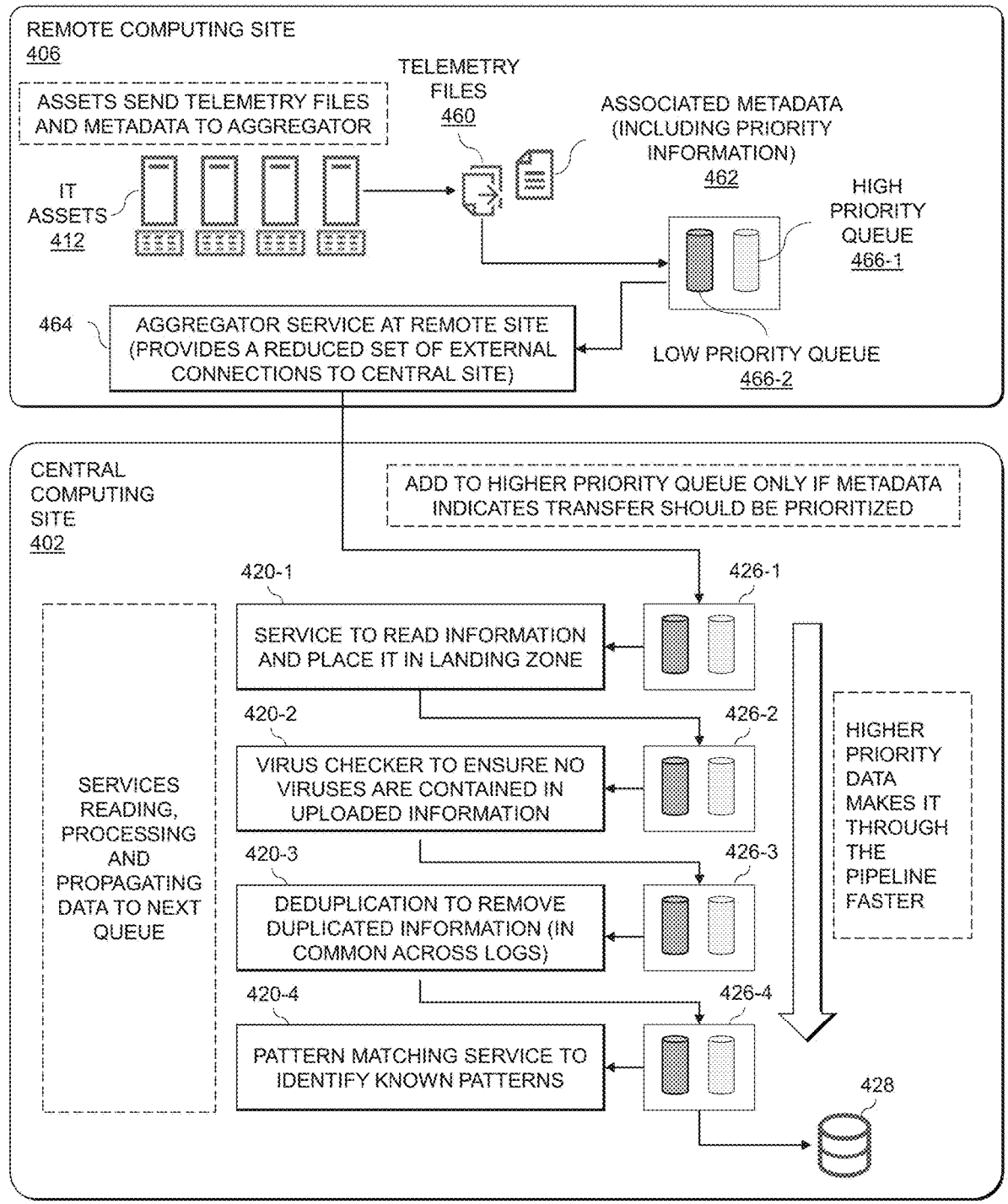
FIG. 4 shows a process flow for prioritized transfer of data between a central or management computing site and a remote computing site in an illustrative embodiment.

FIG. 4 illustrates a prioritized flow of data between a central or management computing site 402 and a remote computing site 406. At the remote computing site 406, a set of IT assets 412 sends telemetry files (or other data) 460 and associated metadata (including priority information) 462 to an aggregator service 464. The telemetry files 460 and associated metadata 462 are stored in a set of queues, including a high priority queue 466-1 and a low priority queue 466-2 (collectively, queues 466). Although FIG. 4 shows an example where there are just two queues 466 with different priorities, such that the telemetry files 460 and associated metadata 462 are stored in either the high priority queue 466-1 or the low priority queue 466-2, this is not a requirement. In other embodiments, there may be three or more queues with three or more different priorities (e.g., low, normal and high priority queues), with the associated metadata 462 specifying which of the three or more different priority queues the telemetry files 460 should be placed in.

The aggregator service 464 provides a reduced set of external connections to the central computing site 402, and takes data (e.g., telemetry files 460 and associated metadata 462) from the queues 466 in accordance with specified logic and provides the data to the central computing site 402. As will be described in further detail below, in some embodiments the aggregator service 464 takes data from the high priority queue 466-1 until it is empty, and then takes data from the low priority queue 466-2. In other embodiments, the aggregator service 464 takes data from the high priority queue 466-1 some specified percentage of time (e.g., 90% of the time), and takes data from the low priority queue 466-2 at other remaining times (e.g., 10% of the time).

At the central computing site 402, a set of services 420-1, 420-2, 420-3 and 420-4 (collectively, services 420) provide a data processing pipeline which processes the data received from the aggregator service 464. Each of the services 420 reads, processes and propagates the data received from the remote computing site 406 to one of an associated set of queue 426-1, 426-2, 426-3 and 426-4 (collectively, sets of queues 426). Each of the sets of queues 426 illustratively includes a high priority queue and a low priority queue, with data being placed in either the high or low priority queue of a given one of the sets of queues 426 by its associated one of the services 420 based on the prioritization information in the metadata 462 associated with the telemetry files 460. In this way, higher priority data makes it through the services 420 pipeline faster. A data store 428 may be used to hold the data after processing by the services 420 pipeline.

Advantageously, the data transfer prioritization logic 110 allows for evaluation of data transfer prioritization across multiple queues (e.g., queues 426 and 466), and enables configuration of prioritization levels in the applications, services or other software (e.g., IT assets 412, aggregator service 464, services 420) that reads data from and writes data to the different message queues (e.g., queues 426 and 466). The data transfer prioritization logic 110 may be implemented within each application, service or other software which handles the data. When writing to message queues (e.g., queues 426 and 466), if data (e.g., telemetry files 460) has elevated data transfer prioritization privileges (e.g., as determined via parsing and analyzing the associated metadata 462), then the data is written to a prioritized version of the queue (e.g., a relatively "high" priority message queue, such as high priority queue 466-1). If the data does not have elevated privileges, it is written to a "normal" version of the queue (e.g., a relatively "low" priority message queues, such as low priority queue 466-2). Again, it should be noted that while some embodiments are described with respect to the use of just two queues with different priorities (e.g., high and low priority queues), in other embodiments there may be more than two queues with different relative priorities (e.g., high, medium and low priority queues).

When reading data from the message queues (e.g., queues 426 and 466), relatively high priority queues are checked more often than normal or relatively lower priority queues. Notifications, messages or other data (e.g., telemetry files 460) at the top of the queues are processed. The relative frequency of checking the "high" versus the "normal" or lower priority queues is configurable. In some embodiments, messages are always taken from a highest priority queue, unless the highest priority queue is empty in which case the next-highest priority queue is checked. In other embodiments, the highest priority queue is checked first some designated percentage of time as will be described in further detail below. When passing to the next stage of the process (e.g., the next message queue for the next service in the chain of services 420 shown in FIG. 4), the data is added to the high priority queue if the prioritization is still valid, and is otherwise added to the normal priority queue.

Advantageously, some embodiments provide the ability for applications, services or other software (e.g., IT assets 412, services 420, aggregator service 464) to configure (e.g., throttle) the amount of prioritization. This can be done by configuring how much a particular service (e.g., one of services 420 and aggregator service 464) prioritize relatively higher priority queues over normal or relatively lower priority queues. For example, it can be useful to reduce the prioritization in the case where so much prioritization occurs that it adversely affects the overall system. The determination of what constitutes "too much" prioritization may be user-configurable or selected based on the needs of a particular use case. The level of prioritization can be throttled across a spectrum based on a percentage referred to herein as a prioritization level.

A prioritization level of 100% means that applications, services or other software (e.g., IT assets 412, services 420, aggregator service 464) will always check higher priority queues first for data to process, so that the only time normal or relatively lower priority queues are checked is when the higher priority queues are empty. A prioritization level of 90% means that applications, services or other software (e.g., IT assets 412, services 420, aggregator service 464) will check the higher priority queues first 90% of the time, and will check the normal or relatively lower priority queues first 10% of the time. To implement such functionality, the applications, services or other software (e.g., IT assets 412, services 420, aggregator service 464) that read and write from the queues may register with an orchestration service to get updates. An end-user or automated system can change the prioritization level of some or all of the applications, services or other software (e.g., IT assets 412, services 420, aggregator service 464) which process queues of the telemetry data as shown in FIG. 4 described above, and as further detailed in FIG. 5 described below which illustrates changes in prioritization level.

Figure 5:
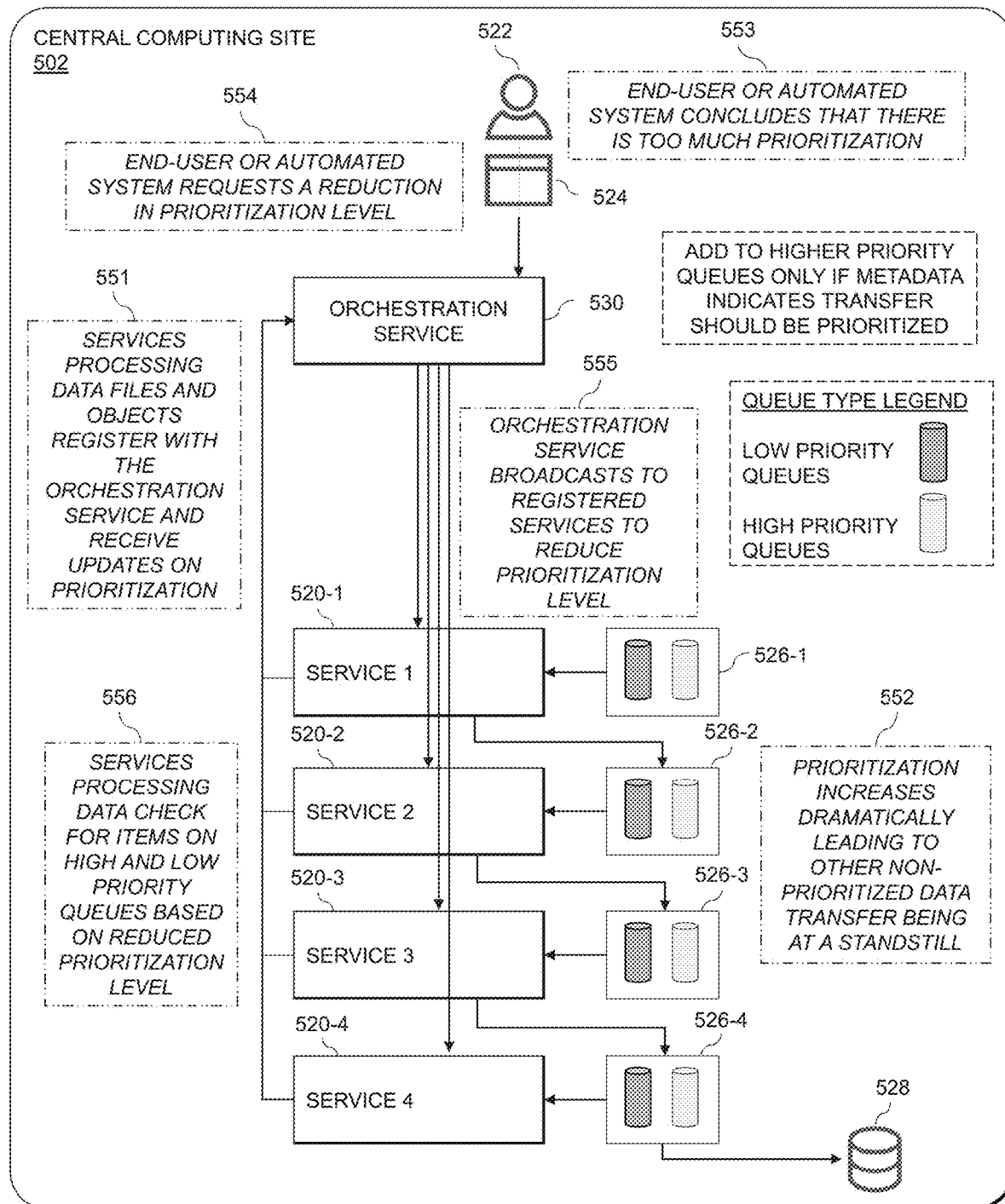
FIG. 5 shows a process flow for configuration of a prioritization level for processing of data at a central or management computing site in an illustrative embodiment.

FIG. 5 shows the central computing site 502, which runs a set of services 520-1, 520-2, 520-3 and 520-4 (collectively, services 520) similar to the services 420 described above with respect to FIG. 4. The services 520 are associated with respective sets of queues 526-1, 526-2, 526-3 and 526-4 (collectively, sets of queues 526), where each of the sets of queues 526 includes a high priority queue and a low priority queue. Again, it should be noted that in other embodiments there may be three or more queues with different relative priorities. A data store 528 may be used to hold the data after processing by the services 520 pipeline. FIG. 5 also shows an end-user or automated system 522 which access via a front-end interface 524 an orchestration service 530. Elements 522 and 524 are similar to the elements 322 and 324 described above with respect to FIG. 3.

Steps 551 through 556 in FIG. 5 illustrate a process flow for configuration of prioritization levels. In step 551, the services 520 which process data files and objects register with the orchestration service 530 to receive updates on prioritization levels and other configurable prioritization parameters (e.g., including whether or not to enable prioritization at all). In step 552, the amount of prioritization increases above some designated threshold. This may correspond to the amount of prioritization increasing dramatically such that other non-prioritized data transfer is at a standstill (e.g., where the amount of data in the low priority queues is above some high watermark threshold, etc.). In step 553, the end-user or automated system 522 determines that there is too much prioritization, and in step 554 utilizes the front-end interface 524 to communicate with the orchestration service 530 to request a reduction in prioritization level. In step 555, the orchestration service 530 broadcasts to the registered service 520 the reduced prioritization level. In step 556, the services 520 check for data items in the high and low priority queues in the sets of queues 526 in accordance with the reduced prioritization level. It should be noted that the reduction in prioritization level may be for a limited time duration (e.g., suspend or otherwise reduce prioritization for a set period of time, or until some other designated condition is reached such as the amount of data in the low priority queues being below a low watermark threshold, etc.).

In some embodiments, the data transfer prioritization logic 110 implements credit-based management for limiting or otherwise controlling data transfer prioritization. Various different types of "credits" may be used to limit or otherwise control elevation of prioritization, including but not limited to: time-based credits; amount-based credits (e.g., for amounts of data transferred by a support agent, for amounts of data transferred by an IT asset, combinations thereof, etc.); number-based credits (e.g., limiting the number of prioritizations that may be performed within a designated time frame, such as a support agent or IT asset being limited to one elevated prioritization per day, etc.); etc. When a data transfer is initiated with an elevated priority, a notification may be generated and presented to an end-user or automated system that has initiated the prioritization elevation. This notification can present some indication or information as to the remaining credits available to the end-user or automated system, the IT asset from which the data is to be transferred, etc. In some cases (e.g., such as where the remaining credits are below some designated threshold), the notification may require the end-user or automated system to confirm whether to proceed with the elevation of prioritization (e.g., to confirm that the elevation of prioritization is still important enough to proceed with given the limited amount of credits available).

Figure 6:
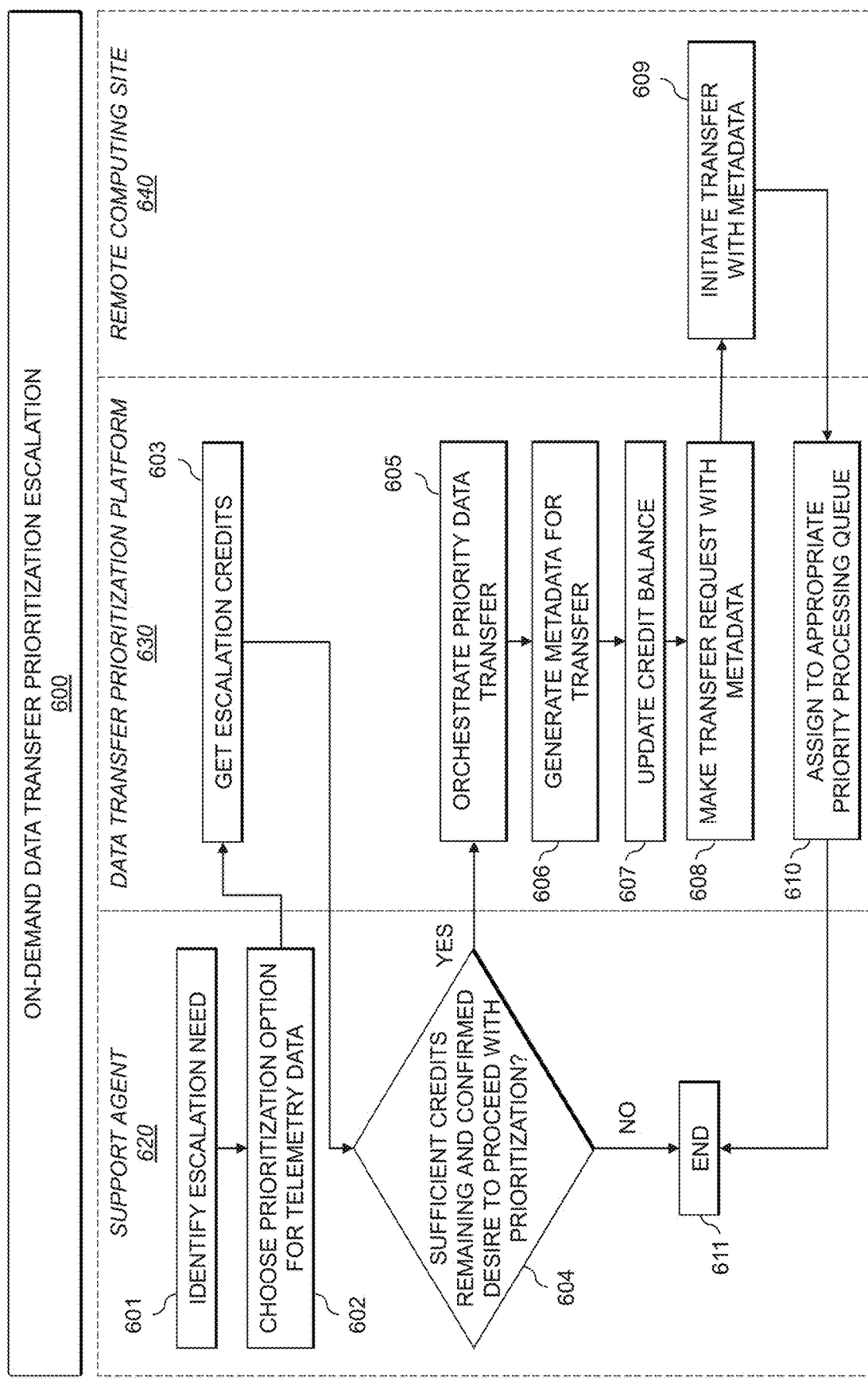
FIG. 6 shows a process flow for on-demand data transfer prioritization escalation in an illustrative embodiment.

FIG. 6 illustrates a process flow for on-demand data transfer prioritization escalation 600, involving a support agent 620, a data transfer prioritization platform 630 (e.g., the central or management computing site 102 and/or one or more of the edge computing sites 104 implementing the data transfer prioritization logic 110), and a remote computing site 640. In the FIG. 6 example, it is assumed that that support agent 620 seeks to upload a single set of telemetry data (e.g., from one or more IT assets at the remote computing site 640) with elevated priority. It should be noted, however, that a request for data transfer prioritization elevation is not necessarily limited to a single set of telemetry data from a single IT asset. Other types of requests may specify that data transfer prioritization should be elevated for some designated time frame and/or from multiple IT assets (e.g., prioritize data transfer from IT asset "ABC" for the next week, prioritize data transfer from a set of IT assets until a case or issue "XYZ" is resolved, prioritize data transfer from all IT assets of type "DEF" for some designated time frame or until some condition is satisfied such as until a case or issue "UVW" is resolved, etc.). Further, while in FIG. 6 the data transfer prioritization elevation request is assumed to be initiated by the support agent 620, an automated system may alternatively initiate the data transfer prioritization elevation request.

The FIG. 6 process flow begins in step 601, where the support agent 620 identifies the need for a high priority upload or data transfer for some set of telemetry data. The support agent 620 in step 602 chooses prioritization options for the set of telemetry data (e.g., a particular prioritization level). In step 603, the data transfer prioritization platform 630 retrieves the escalation credits remaining for this scenario (e.g., the remaining credits available to the support agent 620 and/or the IT assets from which the set of telemetry data is to be transferred) and returns the same to the support agent 620.

In step 604, the support agent 620 determines whether there are sufficient credits remaining for the data transfer prioritization elevation request, and confirms a desire to proceed with the data transfer prioritization elevation. If the result of the step 604 determination is yes (e.g., there are sufficient remaining credits and the support agent 620 deems that the data transfer prioritization elevation is warranted given the amount of remaining credits), the support agent 620 in step 605 invokes or calls the data transfer prioritization platform 630 to initiate the prioritized data transfer for the set of telemetry data. The data transfer prioritization platform 630 in step 606 generates appropriate metadata for the prioritized data transfer. In step 607, the data transfer prioritization platform 630 updates the remaining credits, if appropriate, which serve to limit the amount of data transfer prioritization escalations (e.g., by the support agent 620, from the one or more IT assets that are the source of the set of telemetry data, combinations thereof, etc.). Updates may be made to any relevant credit type and status (e.g., if the support agent 620 has a certain allowable number of escalations per month, then the remaining number of escalations may be decremented accordingly).

The data transfer prioritization platform 630 in step 608 makes a call to a data transfer service that initiates uploads from the IT assets that are the source of the set of telemetry data, and the metadata generated in step 606 are added to the metadata for the data processing requests from such IT assets. In step 609, the data transfer prioritization platform 630 makes a call to initiate the prioritized data transfer at the remote computing site 640. In step 610, services processing the data along the pipeline (e.g., services 420, services 520) at the data transfer prioritization platform 630 will read the additional metadata including the prioritization information and add the set of metadata to the appropriate priority queue as described elsewhere herein. The FIG. 6 process then ends in step 611. The FIG. 6 process also ends in step 611 if the result of the step 604 determination is no (e.g., there are insufficient credits available or the support agent 620 decides not proceed with the data transfer prioritization escalation given the amount of remaining credits).

Consider, as an example, a storage area network (SAN) product (e.g., Dell PowerVault) at a remote computing site which daily collects and uploads telemetry data to some application, service or other software (e.g., a program providing an API that processes telemetry data and exposes such data to applications and services of the management entity operating in a central or management computing site). In such a scenario, collections of telemetry data will be uploaded (e.g., for each IT asset, where the data may be tagged with an identifier (ID) of the IT asset) as part of normal processing. There is a defined use case (which can occur frequently), where an end-user of a given IT asset at the remote computing site will initiate upload of a collection of telemetry data during a call with a support agent (e.g., at the central or management computing site) to troubleshoot issues encountered on the given IT asset. In such a scenario, these on-demand collections of telemetry data can be uploaded to the landing zone (e.g., at the central or management computing site) on the same lines as other regular collection, but metadata of these on-demand uploaded collections can be pushed (e.g., in the form of messages in Apache Kafka or RabbitMQ) to a higher priority topic/queue with elevated processing priority (e.g., for processing by extract, transform, load (ETL) pipelines). The ETL pipelines can easily identify messages containing collection metadata in priority topics/queues and process them accordingly.

In some conventional approaches, priority may be set at a queue level (e.g., when a client creates a queue) and publishers can set the priority of messages while publishing the messages. However, this prioritization in conventional approaches does not propagate automatically from one part of a pipeline to another. Thus, prioritization in such conventional approaches cannot be controlled at a system level (e.g., to reduce or throttle prioritization if the amount of prioritization rises to a level that is detrimental to the system). In addition, prioritization in such conventional approaches lacks mechanisms for implementing time-bound prioritization and other advantageous features enabled using the data transfer prioritization logic 110 described herein.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data transfer prioritization for services in a service chain will now be described in greater detail with reference to FIGS. 7 and 8. Although described in the context of system 100, these platforms may also be used to implement at least portions of other information processing systems in other embodiments.

Figure 7:
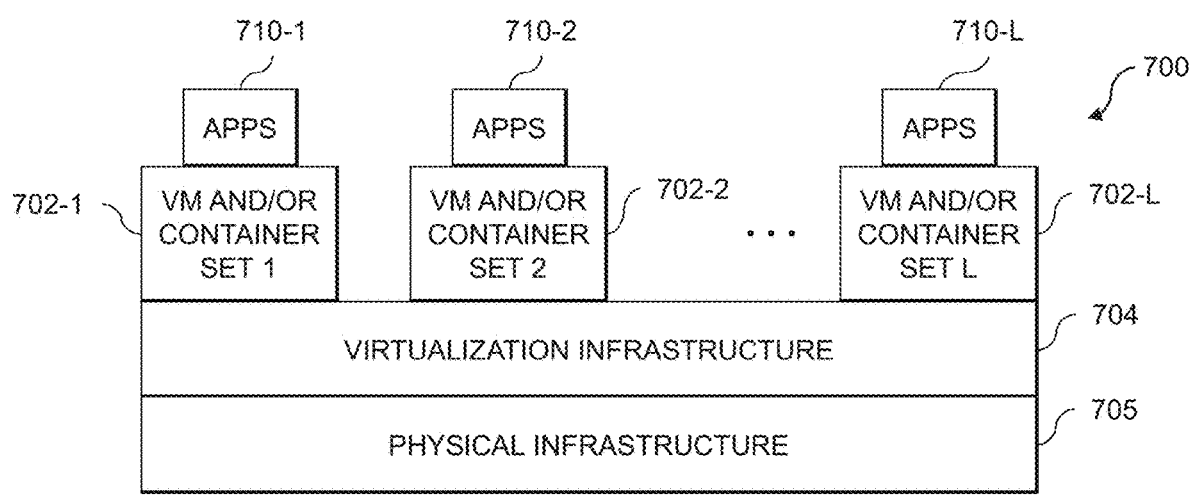
FIGS. 7 and 8 show examples of processing platforms that may be utilized to implement at least a portion of an information processing system in illustrative embodiments.
Figure 8:
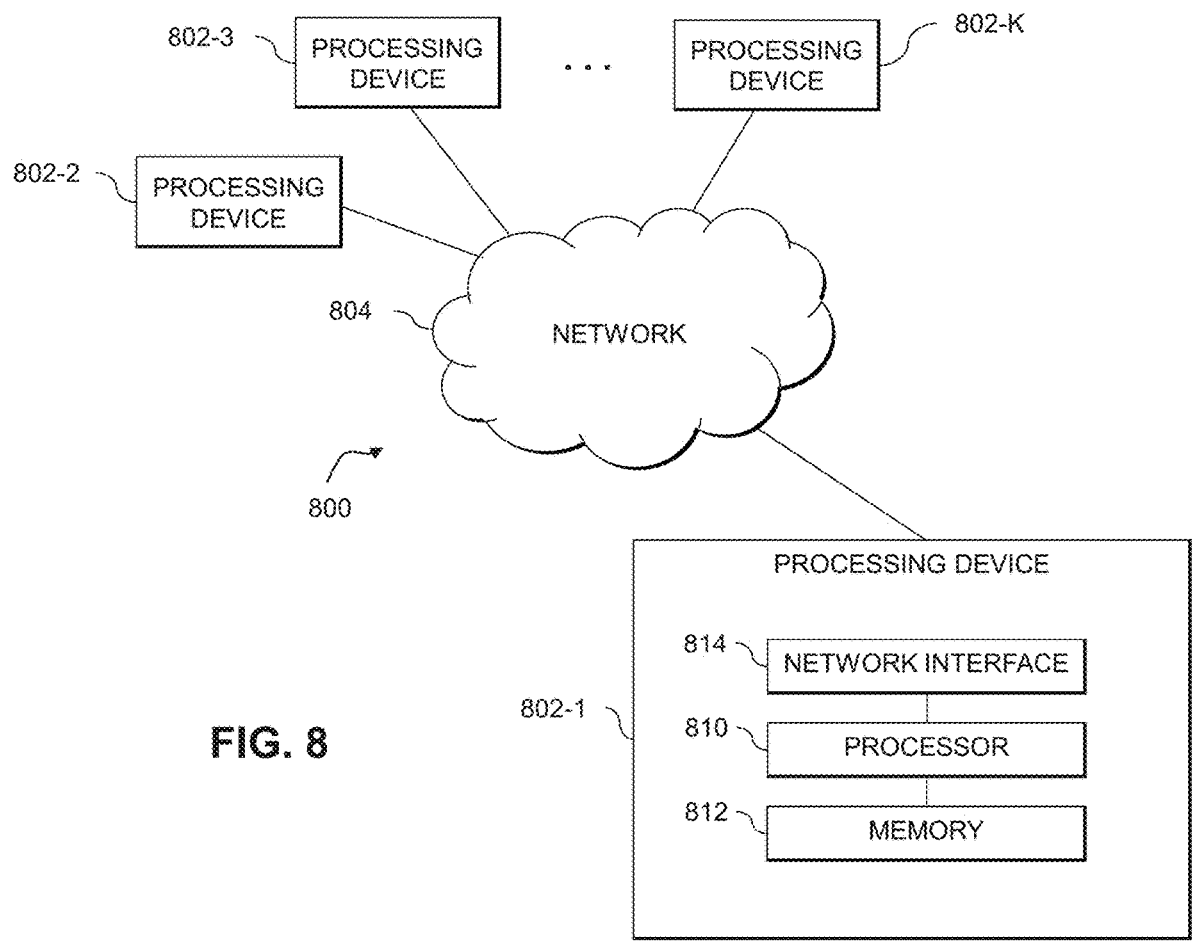

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data transfer prioritization for services in a service chain as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, services, IT assets, prioritization parameters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   monitoring, by a first one of two or more services in a service chain, a first one of two or more sets of processing queues associated with the first one of the two or more services in the service chain, each of the two or more sets of processing queues comprising two or more different processing queues associated with two or more different priority levels;
   processing, by the first one of the two or more services in the service chain, at least a given portion of data stored in at least one of the two or more different processing queues in the first one of the two or more sets of processing queues;
   determining prioritization information associated with the given portion of the data;
   selecting, based at least in part on the determined prioritization information associated with the given portion of the data, a given one of two or more different processing queues in a second one of the two or more sets of processing queues associated with a second one of the two or more services in the service chain; and
   storing the given portion of the data in the given one of the two or more different processing queues in the second one of the two or more sets of processing queues associated with the second one of the two or more services in the service chain.

2. The apparatus of claim 1 wherein the two or more services in the service chain comprise two or more microservices.

3. The apparatus of claim 1 wherein the prioritization information is stored in metadata associated with the given portion of the data.

4. The apparatus of claim 1 wherein the prioritization information specifies a duration for which the given portion of the data is to be processed at an elevated processing priority.

5. The apparatus of claim 1 wherein processing the given portion of data stored in said at least one of the two or more different processing queues in the first one of the two or more sets of processing queues comprises selecting the given portion of the data stored in said at least one of the two or more different processing queues in the first one of the two or more sets of processing queues based at least in part on a designated prioritization level specifying relative frequency of selecting the given portion of the data from each of the two or more different processing queues in the first one of the two or more sets of processing queues.

6. The apparatus of claim 5 wherein the designated prioritization level is dynamically adjusted in response to detecting one or more designated conditions.

7. The apparatus of claim 6 wherein the one or more designated conditions comprise amounts of data stored in the two or more different processing queues in the two or more sets of processing queues.

8. The apparatus of claim 5 wherein the designated prioritization level is specified by an orchestrator service in the service chain.

9. The apparatus of claim 8 wherein the orchestrator service in the service chain dynamically adjusts the designated prioritization level in response to requests from a management entity operating the service chain.

10. The apparatus of claim 1 wherein the given portion of the data comprises telemetry data associated with at least one information technology asset deployed at a remote computing site, the two or more services in the service chain running in at least one of an edge computing site associated with the remote computing site and a management computing site associated with a management entity deploying the at least one information technology asset at the remote computing site.

11. The apparatus of claim 10 wherein the prioritization information is specified by a given support agent of the management entity.

12. The apparatus of claim 11 wherein selecting the given one of the two or more different processing queues in the second one of the set of two or more processing queues associated with the second one of the two or more services in the service chain comprises:
   identifying a remaining amount of prioritization credits allocated to at least one of the given support agent of the management entity and the at least one information technology asset; and
   determining whether the remaining amount of prioritization credits allocated to the given support agent is sufficient to enable elevated priority processing of the given portion of the data by the second one of the two or more services in the service chain.

13. The apparatus of claim 12 wherein determining whether the remaining amount of prioritization credits allocated to the given support agent is sufficient to enable elevated priority processing of the given portion of the data by the second one of the two or more services in the service chain further comprises:
   providing, to the given support agent, a notification specifying the remaining amount of prioritization credits; and
   receiving, from the given support agent, an instruction on whether to enable elevated priority processing of the given portion of the data by the second one of the two or more services in the service chain.

14. The apparatus of claim 12 wherein the remaining amount of prioritization credits comprises at least one of a number of prioritization requests and an amount of data.

15. A computer program product comprising a non-transitory processor-readable storage medium having stored therein program code of one or more software programs, wherein the program code when executed by at least one processing device causes the at least one processing device to perform steps of:
monitoring, by a first one of two or more services in a service chain, a first one of two or more sets of processing queues associated with the first one of the two or more services in the service chain, each of the two or more sets of processing queues comprising two or more different processing queues associated with two or more different priority levels;
processing, by the first one of the two or more services in the service chain, at least a given portion of data stored in at least one of the two or more different processing queues in the first one of the two or more sets of processing queues;
determining prioritization information associated with the given portion of the data;
selecting, based at least in part on the determined prioritization information associated with the given portion of the data, a given one of two or more different processing queues in a second one of the two or more sets of processing queues associated with a second one of the two or more services in the service chain; and
storing the given portion of the data in the given one of the two or more different processing queues in the second one of the two or more sets of processing queues associated with the second one of the two or more services in the service chain.

16. The computer program product of claim 15 wherein the given portion of the data comprises telemetry data associated with at least one information technology asset deployed at a remote computing site, the two or more services in the service chain running in at least one of an edge computing site associated with the remote computing site and a management computing site associated with a management entity deploying the at least one information technology asset at the remote computing site.

17. The computer program product of claim 16 wherein the prioritization information is specified by a given support agent of the management entity, and wherein selecting the given one of the two or more different processing queues in the second one of the set of two or more processing queues associated with the second one of the two or more services in the service chain comprises:
identifying a remaining amount of prioritization credits allocated to at least one of the given support agent of the management entity and the at least one information technology asset; and
determining whether the remaining amount of prioritization credits allocated to the given support agent is sufficient to enable elevated priority processing of the given portion of the data by the second one of the two or more services in the service chain.

18. A method comprising:
monitoring, by a first one of two or more services in a service chain, a first one of two or more sets of processing queues associated with the first one of the two or more services in the service chain, each of the two or more sets of processing queues comprising two or more different processing queues associated with two or more different priority levels;
processing, by the first one of the two or more services in the service chain, at least a given portion of data stored in at least one of the two or more different processing queues in the first one of the two or more sets of processing queues;
determining prioritization information associated with the given portion of the data;
selecting, based at least in part on the determined prioritization information associated with the given portion of the data, a given one of two or more different processing queues in a second one of the two or more sets of processing queues associated with a second one of the two or more services in the service chain; and
storing the given portion of the data in the given one of the two or more different processing queues in the second one of the two or more sets of processing queues associated with the second one of the two or more services in the service chain;
wherein the method is performed by at least one processing device comprising a processor coupled to a memory.

19. The method of claim 18 wherein the given portion of the data comprises telemetry data associated with at least one information technology asset deployed at a remote computing site, the two or more services in the service chain running in at least one of an edge computing site associated with the remote computing site and a management computing site associated with a management entity deploying the at least one information technology asset at the remote computing site.

20. The method of claim 19 wherein the prioritization information is specified by a given support agent of the management entity, and wherein selecting the given one of the two or more different processing queues in the second one of the set of two or more processing queues associated with the second one of the two or more services in the service chain comprises:
identifying a remaining amount of prioritization credits allocated to at least one of the given support agent of the management entity and the at least one information technology asset; and
determining whether the remaining amount of prioritization credits allocated to the given support agent is sufficient to enable elevated priority processing of the given portion of the data by the second one of the two or more services in the service chain.

* * * * *